US007500581B2

(12) United States Patent
O'Leary et al.

(10) Patent No.: US 7,500,581 B2
(45) Date of Patent: Mar. 10, 2009

(54) LIQUID REFRIGERANT TRANSFER TOOL

(75) Inventors: Neil O'Leary, Stormville, NY (US); Frederick Tedesco, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 11/136,907

(22) Filed: May 25, 2005

(65) Prior Publication Data

US 2006/0266768 A1 Nov. 30, 2006

(51) Int. Cl.
*B65D 5/00* (2006.01)
*G01N 1/00* (2006.01)

(52) U.S. Cl. ........................ 222/1; 222/83.5; 222/464.1; 73/863.85

(58) Field of Classification Search ................... 222/82, 222/83, 83.5, 88, 89, 464.1, 5, 1
See application file for complete search history.

(56) References Cited

U.S. PATENT DOCUMENTS

| | | | | |
|---|---|---|---|---|
| 2,853,126 | A * | 9/1958 | Corlet | 222/5 |
| 3,201,994 | A * | 8/1965 | Adams | 73/863.85 |
| 4,278,132 | A * | 7/1981 | Hostetter | 169/13 |
| 4,285,445 | A * | 8/1981 | Vander Molen et al. | 222/49 |
| 5,875,921 | A * | 3/1999 | Osgar et al. | 222/1 |

* cited by examiner

*Primary Examiner*—Kevin P Shaver
*Assistant Examiner*—Melvin A Cartagena
(74) *Attorney, Agent, or Firm*—George A. Williamson; August Law Group LLC.

(57) ABSTRACT

A liquid transfer tool is provided that facilitates safe removal or transfer of liquids from containers in the upright position. The tool includes a retractable sealed tube that can pierce a seal and that extends to the bottom of the container to extract substantially all of the liquid disposed in the container.

1 Claim, 5 Drawing Sheets

LIQUID REFRIGERANT TRANSFER TOOL

FIELD OF THE INVENTION

The present invention is directed to the field of plumbing fixtures for liquid transfer.

BACKGROUND OF THE INVENTION

Many liquids, for example liquids used in industrial and commercial settings, are stored and dispensed from large containers, for example metal drums, or are transferred between storage containers. Due to the cost associated with these liquids, substantially all of the liquid in a given container is used. Therefore, during transfer or dispensing of these liquids from the container, substantially all of the liquid is removed from the container. All of the liquid can be removed if the container is tapped or drained at or near the bottom. This, however, requires that a fitting and possibly a valve is provided with the container. However, installed fittings and valves add cost to the container and can be damaged during shipment. In addition, the container can be rotated or positioned so that the fitting are not located at the bottom of the container. Alternatively, a full container can be tapped or opened. This procedure, however, can be hazardous and can result in liquid being spilled from the container. The spilled liquid can represent an unnecessary environmental hazard and could result in an unnecessary cost associated with the spilled liquid.

Openings can also be provided at the top of the container. Typically, these types of containers are opened and tilted to remove the liquid. Tilting presents a potential spill hazard and larger or heavier containers can be difficult to lift and tilt. Current applications use a steel nipple that is threaded into a complementary fitting disposed at the top of the container, for example within the bung cap of drum. Threading the fitting into the bung cap breaks a seal to permit the liquid within the container to be removed or transferred. Unless the container is tilted, only the vapor in the head space above the liquid can be removed.

SUMMARY OF THE INVENTION

The present invention eliminates the need to invert storage containers and in particular liquid refrigerant drums during the charging process of industrial chillers. Exemplary tools in accordance with the present invention significantly reduce the risk of CFC release into the surrounding area and atmosphere. In addition, injury to operators or damage to equipment that could result from moving or inverting containers is avoided.

In accordance with one exemplary embodiment of the present invention, the liquid transfer tool includes a container connection assembly arranged to secure the liquid transfer tool to a container. The container connection assembly includes a main body portion having a central shaft passing completely through it. A compression fitting containing a compression adaptor, Teflon® ferrule and compression nut is disposed at a first end of the main body portion around the opening to the central shaft, and a connector for connecting the main body portion to an opening of the container is attached to a second end of the main body portion opposite the first end and capable. Since container openings often contain threaded fittings, the connector disposed adjacent the second end of the main body portion can be a threaded fitting. For example, the main body portion can be a length of pipe and the connector a threaded end of that pipe.

The transfer tool also includes an extraction tube assembly connected to the container connection assembly by inserting a down tube through the compression fitting and central shaft so that an open end of the down tube extends past the second end of the main body portion. The extraction tube assembly also includes a valve attached to the down tube and capable of controlling the flow of liquid through the down tube. The compression fitting is capable of creating a substantially airtight seal between the down tube and the central shaft after the down tube is inserted through the central shaft. A handle is attached to the down tube and arranged to assist in the insertion of the down tube through the container connection assembly. In addition, a container piercing tip disposed adjacent an open end of the down tube is provided to pierce any seals covering openings in the container into which the down tube is inserted. In order to monitor the flow of liquids through the extraction tool, the extraction tube assembly also includes a flow indicator in communication with the down tube. Suitable materials for the main body portion, down tube and valve include stainless steel.

The present invention is also directed to methods for extracting liquids from containers using the extraction tool of the present invention. In particular, the method can be used to extract all the liquid refrigerant from a 55 gallon drum for delivery to a chiller without tilting the drum. The method includes securing a connection assembly having a central shaft to an opening of the container. A down tube is passed through the central shaft and into the container until an open end of the down tube is disposed below a liquid level in the container. Preferably, the open end is inserted substantially to the bottom of the container. An airtight seal between the down tube and the central shaft is formed using a compression fitting with a Teflon® seal to prevent gases and aerosols from escaping during liquid transfer. The top end of the down tube opposite the open end is connecting to the desired destination for the liquid, and the liquid is transferred from the container to the destination through the down tube.

Various methods can be used to force or draw the liquid through the down tube. Preferably, the liquid is transferred using a source of vacuum at the destination to draw the liquid through the down tube. Since the down tube can be inserted to the bottom of the container, all of the liquid from the container is transferred to the destination without tilting the container. The flow of liquid is controlled using a valve and monitored using a flow indicator. Since the openings of the container are often covered by seals, those seals are broken or pierced using a piercing tip located adjacent the open end of the open tube. A handle attached to the down tube is used to apply the necessary force to drive the piercing tip through the seal.

DETAILED DESCRIPTION

Figure 1:
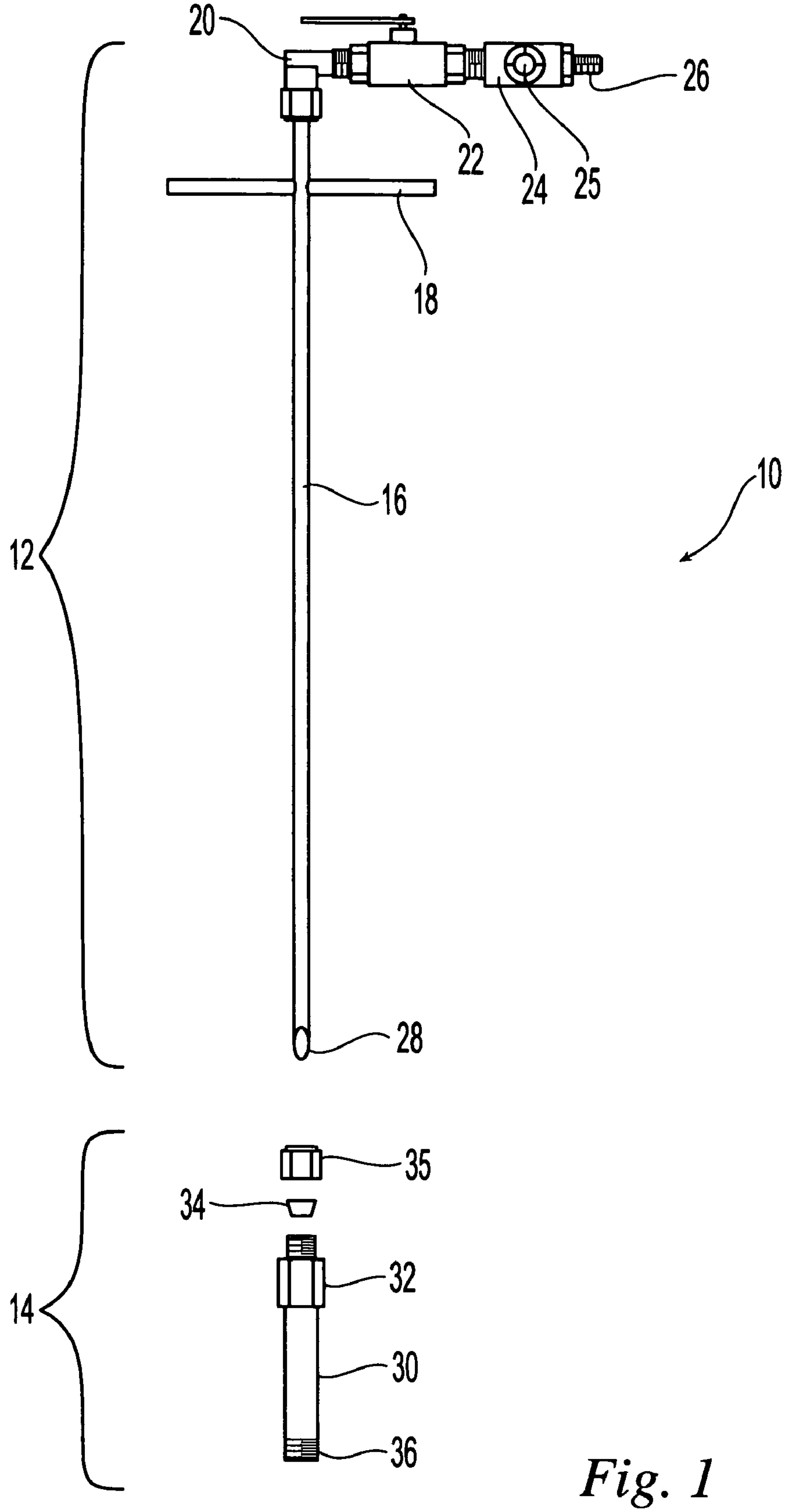
FIG. 1 is an exploded view of an embodiment of a transfer tool in accordance with the present invention.

Referring initially to FIG. 1, an exemplary embodiment of a liquid transfer tool 10 in accordance with the present invention is illustrated. As illustrated, the liquid transfer tool 10 includes two assemblies, a drum or container connection assembly 14 and an extraction tube assembly 12. The container connection assembly 14 is arranged to securely connect the liquid transfer tool 10 to a container or drum and to provide support for the extraction tube assembly 12. In one embodiment, the container connection assembly includes a main body portion 30. In one embodiment, the main body portion is a shaft, tube or piper having an inner diameter that is sufficient to accept the extraction tube assembly. The tube can be fabricated as a custom fitting or can be a standard plumbing fitting, for example a standard male or female nipple. In one embodiment, the main body portion 30 is a ¾ inch national pipe thread (npt) male nipple having a length of about 6 inches. The materials for the main body portion are selected to provide the desired mechanical strength and compatibility with the liquids to be removed or transferred from the container. Suitable materials include copper, brass, steel and stainless steel (304 and 316) pipe and tubing.

The main body portion 30 is adapted to connect to the container. The connection can be a fixed connection or a releasable connection. In one embodiment, the main body portion 30 includes a threaded fitting 36 either female or male threads. This threaded fitting 36 can be applied by machining an end of the main body portion or by welding a male or female adaptor onto an end of the main body portion. Alternatively, the threaded fitting is provided with the main body portion as when the main body portion is a standard male nipple.

In addition to providing a mechanism for securing the container connection assembly 14 to the container, a mechanism is provided to secure the extraction tube assembly 12 to the container connection assembly 14. In one embodiment, a compression fitting that includes a compression adaptor body 32, a compression ferule 34 and a compression nut 35 is attached to an end of the main body portion 30 opposite the threaded fitting 36. The compression adaptor body 32 can be any commercially available compression adaptor body sized to fit on the main body portion 30 and to accept the extraction tube assembly 12. In one embodiment, the compression adaptor body 32 is a ¾ inch npt female compression adaptor body. In order to allow at least a portion of the extraction tube assembly 12 to pass through the compression adaptor assembly, the inner diameter of the compression adaptor body is enlarged or milled to an adequate diameter. In one embodiment, the inner diameter is milled to about 0.81 inches. Suitable materials for the compression adaptor assembly 32 are the same as those for the main body portion 30. Preferably, the compression adaptor assembly 32 is constructed from stainless steel.

The compression ferrule 34 provides a seal between the evacuation tube assembly and the compression fitting. Preferably, the compression ferrule is constructed from a fluoropolymer. Suitable fluoropolymers include Teflon®, which is commercially available from E.I. du Pont de Nemours and Company of Wilmington, Del. In general, the material of the compression ferrule is selected to provide the desired sealing properties and to be compatible with the liquids to be transferred. In addition, since the extraction tube assembly 12 is to be inserted through the compression ferrule, the material of the compression ferrule is selected to facilitate ease of insertion of the extraction tube assembly. In one embodiment, the compression ferule has an inside diameter of about ¾ inch. The compression ferrule preferably does not become fixed to the extraction tube assembly during sealing so that the extraction tube assembly can be removed from the drum connection assembly following transfer or removal of the liquid. The compression nut 35 is threaded onto the compression adaptor assembly 32 to compress the compression ferrule 34. Suitable materials for the compression nut 35 are the same as for the compression adaptor assembly 32. In one embodiment, the compression nut 35 is a ¾ inch stainless steel compression nut.

The use of a compression fitting assembly in the drum connection assembly provides the benefit of a liquid-tight and an air-tight seal so that liquids and vapors do not escape during the liquid removal or transfer process. In addition, the compression fitting using the polymer compression ferrule and threaded compression nut provides for tightening and loosening of the compression ferrule so that the extraction tube can be inserted and removed. In addition, by loosening the compression, the extraction tube assembly can be moved with respect to the container attachment assembly to provide for various lengths of insertion of the extraction tube into the container.

In one embodiment, the extraction tube assembly includes a down tube portion 16. Suitable materials for the down tube portion 16 are the same as those for the main body portion 30 of the tank connection assembly 14. Preferably, the down tube portion is constructed from a rigid material, for example stainless steel pipe or tube. The length of the down tube portion is varied depending on the size and depth of the container to which the transfer tool 10 is connected. In one embodiment, the length of the down tube portion 16 is selected to be suitable for the largest or deepest container to which the transfer tool 10 is connected. Suitable lengths include about 36 inches, which is a suitable length for conventional 50 gallon metal drums. The down tube portion 16 is sized to fit into and through the tank connection assembly. In one embodiment, the down tube portion has an outside diameter of about ¾ inch. Since the down tube portion can be moved relative to the tank connection assembly, containers of varying sizes and depths are accommodated with a single down tube portion 16.

Located at the open end of the down tube assembly, i.e. the end to be inserted into the container and into which the liquid is drawn, a piercing tip 28 is formed. The piercing tip 28 is used to pierce through seals, for example metal foils, that are used to seal container openings. As illustrated, the piercing tip is a beveled end of the down tube portion. In addition to providing a relatively sharp or piercing leading end, the beveled edge allows the down tube to be inserted into a container until it contacts the bottom of the container without blocking or obstructing the opening of the down tube. Therefore, liquid is removed from the bottom of the container until substantially all of the liquid has been removed.

In one embodiment, one or more handles 18 are attached to the down tube 16 to provide for insertion and removal of the down tube into the container. In particular, the handles provide for the application of force necessary to pierce any container seal and to drive the down tube through that seal. The handles are attached to the down tube so as not to weaken the structural integrity of the down tube or restrict the flow of liquids through the down tube. In one embodiment, two handles are welded to either side of the down tube. In addition, the handles can be threaded into sockets that are tapped into or brazed onto the sides of the down tube. This threaded arrangement provides for removal of the handles when the tool is not in use. In one embodiment, the each handle is about a ½ inch outside diameter stainless rod that is about 3⅝ inches long. As illustrated, two handles are attached to the down tube on substantially opposite sides of the tube.

In one embodiment, the extraction tube assembly 12 includes a valve 22. The valve can be a manual valve or an automated valve such as a solenoid valve. Any type of valve can be used; including quarter turns valves, needle valves, ball valves and gate valves. In one embodiment, the valve is a ball valve. Suitable materials for the valve are selected to be compatible with the liquid to be withdrawn from the tank and include steel, stainless steel (304 and 316) and brass. Preferably, the valve 22 is a stainless steel valve. The size of the valve is selected to facilitate the desired flow of liquid and to match the size of the other components of the extraction tube assembly. In one embodiment, the valve 22 is a ¾ inch valve. The valve provides control of the flow of liquids through the extraction tool.

Suitable fittings for attachment of the valve to the down tube or other fittings include threaded fittings, for example male or female npt fittings, compression fittings and soldered fittings. In one embodiment, the valve is directly connected to the down tube. Alternatively, one or more fittings are disposed between the down tube and the valve. In one embodiment, an elbow 20 is disposed between the down tube 16 and the valve 22. Preferably, the elbow is a 90° elbow. Suitable materials for the elbow are the same as those for the down tube and valve. Preferably, the elbow is a stainless steel elbow. The elbow can be connected to the down tube and valve using any suitable attachment mechanism known in the art including male or female threads, solder and compression fittings. In one embodiment, the elbow 20 is connected to the down tube 16 using a compression fitting and to the valve using a treaded fitting. The size of the elbow is selected to be compatible with the size of the down tube and the valve. Although the elbow can have different size fittings on either end, preferably the elbow has the same size fitting on either end. In one embodiment, the elbow is a ¾ elbow.

In order to allow an operator to check that the liquid is flowing through the extraction tool, a liquid line sight glass is installed on the discharge side of the main control valve. Alternatively, a flow meter or flow accumulator can be included in the extraction tube assembly. In one embodiment, the extraction tool assembly includes a flow indicator 24 that contains a sight window 25 to permit visual indication of the liquid flow during removal or transfer. The flow indicator can be located at any point in the extraction tube assembly; however, the flow indicator is preferably located past the valve. Suitable flow indicators are know and available in the art. The materials, fittings and sizes of the flow indicator are the same as for the other components of the extraction tube assembly and are selected to be compatible therewith. In one embodiment, the flow indicator is a ¾ inch npt male by ¾ inch female brass flow indicator.

In one embodiment, the extraction tube assembly also includes a connector or adaptor fitting 26 to connect the extraction tube assembly 12 to the receiving container or equipment to which the liquid is to be transferred. In one embodiment, the adaptor fitting is a male or female npt threaded adaptor. Other fittings include flare fittings, compression fittings and solder fittings. Suitable materials and sizes are the same as for the other components and are selected to be compatible therewith. In one embodiment, the adaptor fitting 26 is a ¾ inch npt male by ½ inch male flare brass adapter fitting.

The extraction tube assembly 12 can also include additional components or fittings including, but not limited to, backflow prevention devices, pressure relief valves and vacuum relief valves.

Figure 2:
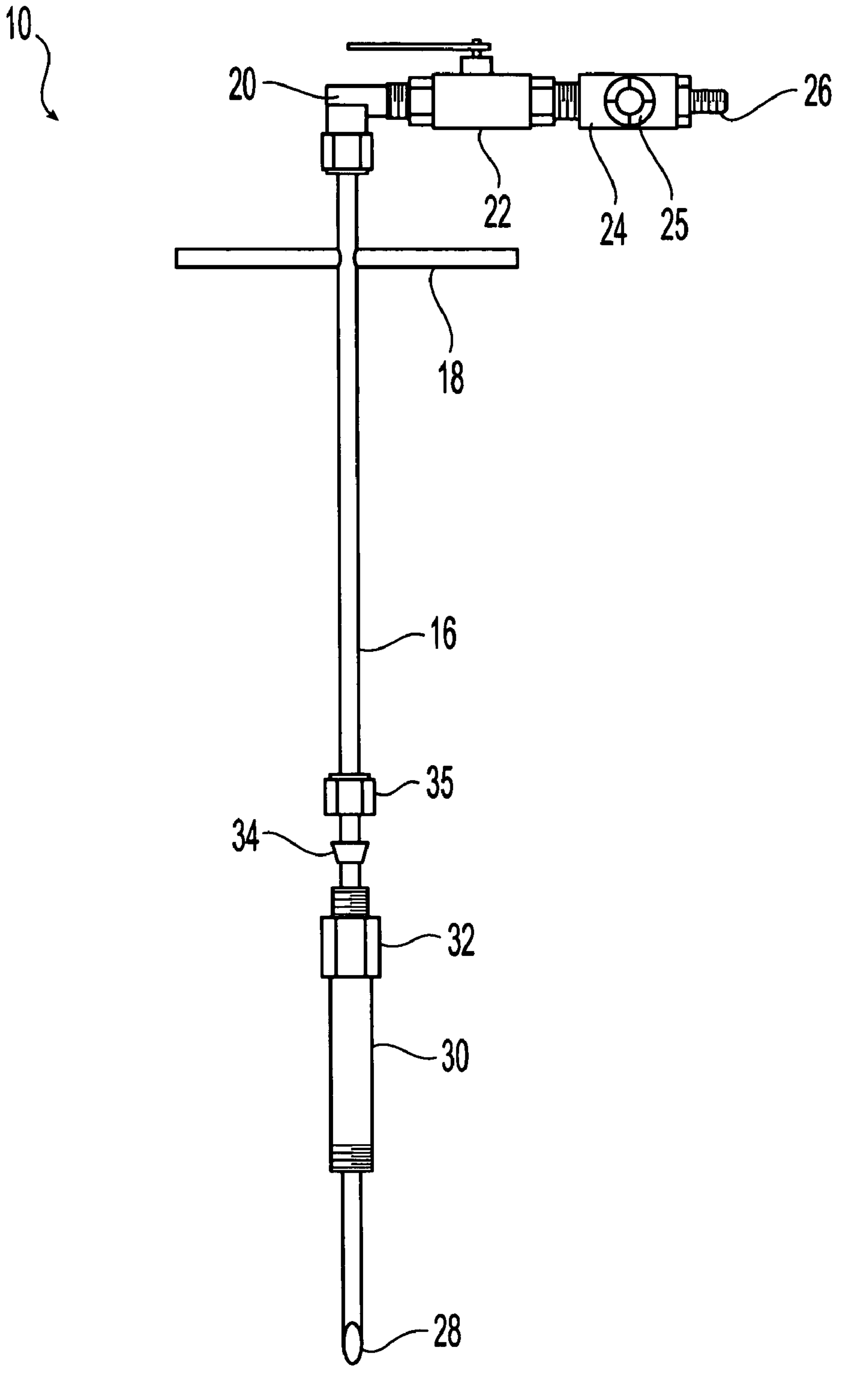
FIG. 2 is a view of the transfer tool of FIG. 1, with the extraction tube assembly inserted through the container connection assembly.

As illustrated in FIG. 2, in one embodiment, the down tube 16 is passed through the compression nut 35, ferrule 35, compression adaptor 32 and main body portion 30 so that the beveled end 28 extends completely through the main body portion a distance that is sufficient for the container into which the extraction tool is to be inserted. Suitable containers include, but are not limited to, drums, both metal and plastic, tanks collapsible tanks, liquid bulk containers, closed-head and open-head plastic containers, pillow storage tanks, bladder tanks and carboys. In one embodiment, the container is a 55 gallon metal drum. These containers can hold any type of liquid and in particular hold liquids that are used in industrial applications. In one embodiment, the liquid is liquid refrigerant such as Freon-11. The down tube 16 is initially passed through the drum connection assembly 14 while the nut, ferrule and compression adapter are in an open or uncompressed state. This allows the down tube to move freely to the desired insertion length. In addition, the container connection assembly 14 can be connected to the container first, before the extraction tube assembly.

Figure 3:
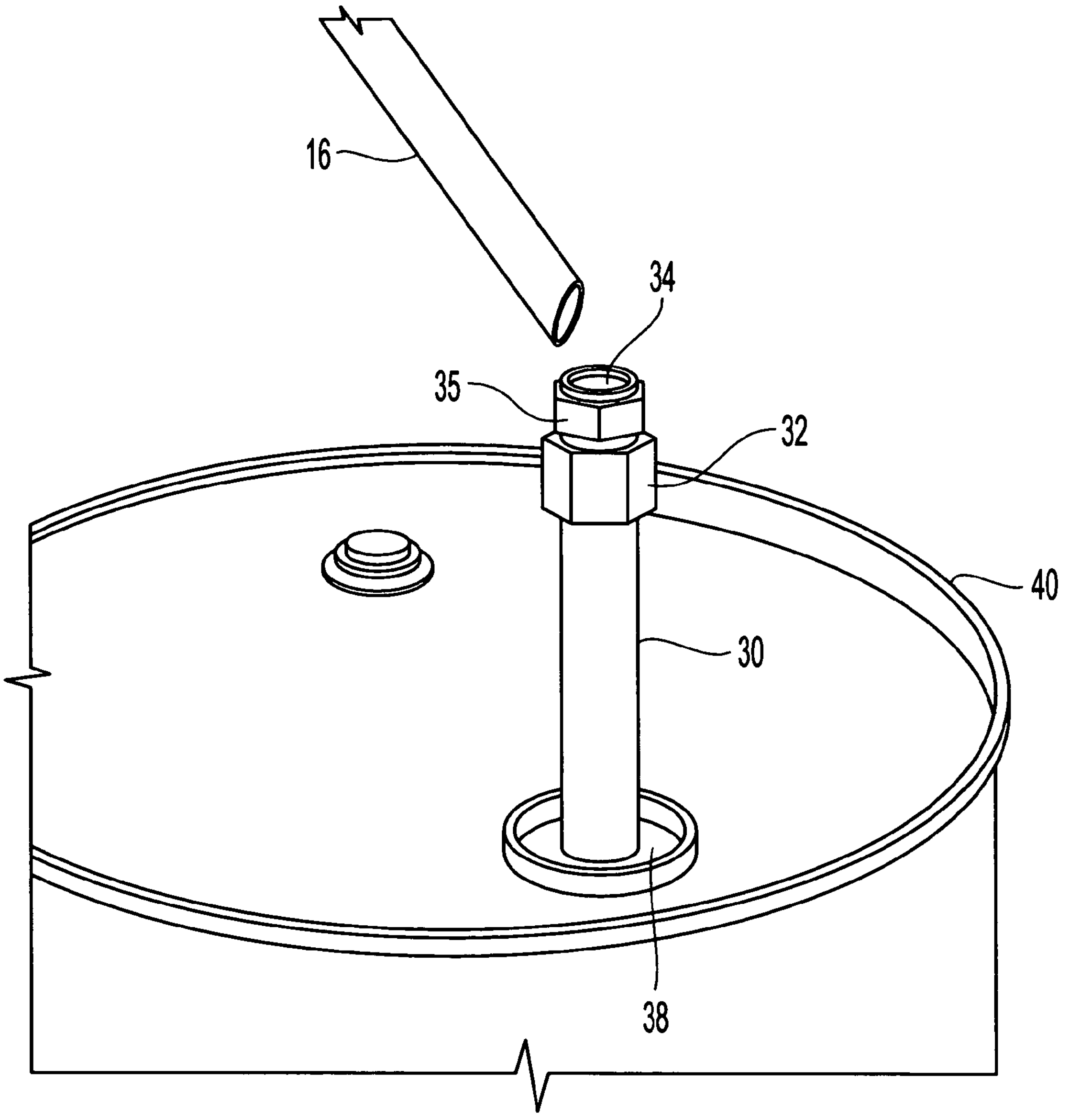
FIG. 3 is a perspective view of the container connection assembly connected to an opening of a drum.
Figure 4:
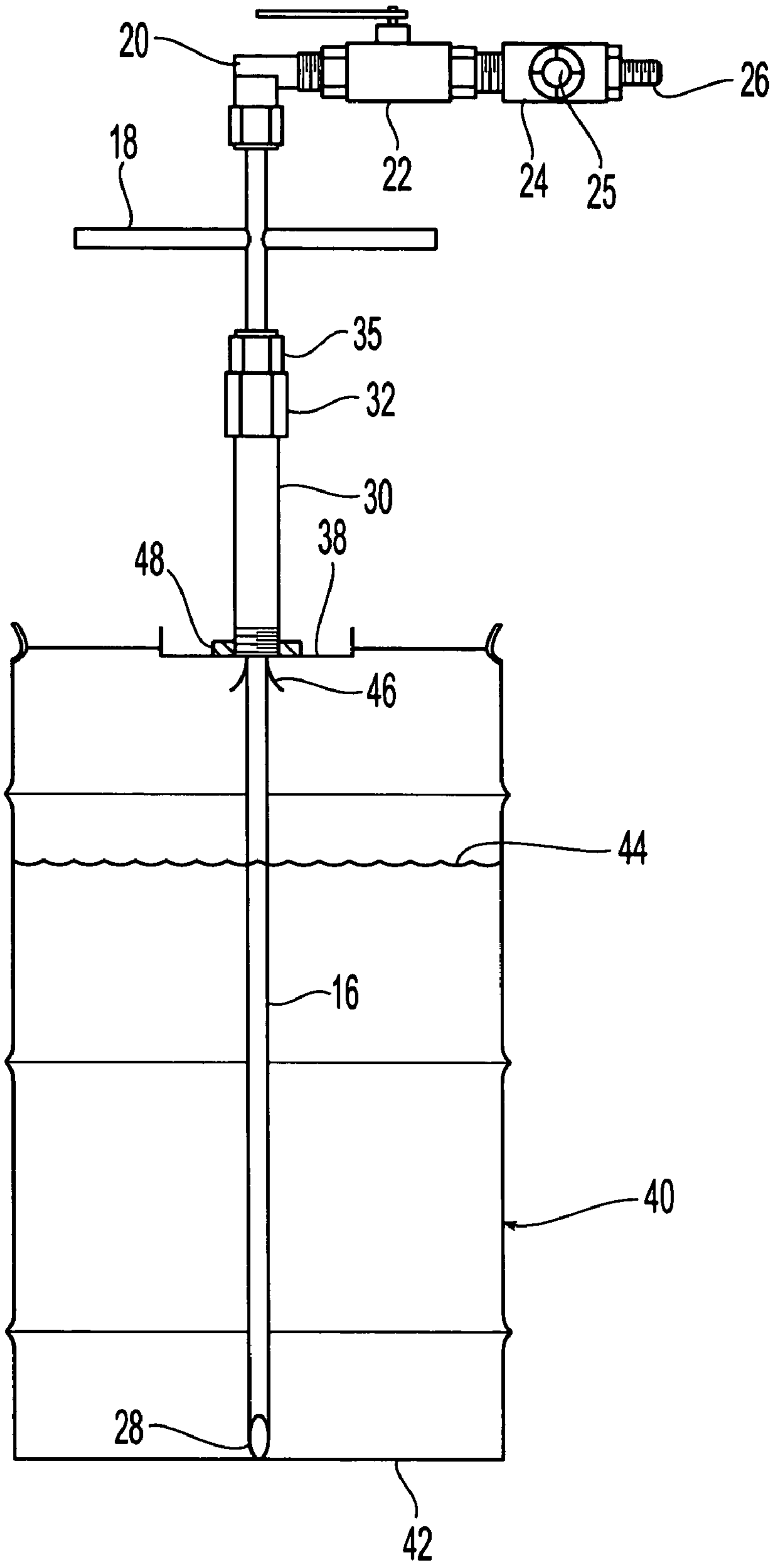
FIG. 4 is a partially cutaway view of the extraction tool inserted into a drum.

As illustrated in FIG. 3, in one exemplary embodiment, the container connection assembly is connected to an opening 38 at the top of a 55 gallon drum 40. The down tube 16 is then inserted through the connection assembly, for example using the handles 18. As illustrated in FIG. 4, the down tube 16 passes into the drum 40 until the leading edge of the beveled portion 28 comes into contact with the bottom 42 of the tank 40. The compression nut 35 is then tightened to provide the desired seal. In this arrangement, the opening of the beveled end 28 of the down tube 16 will be located below the liquid level 44 in the tank for the duration of the liquid transfer. When the down tube 16 passes through the connection assembly, the beveled end 28 punctures or ruptures any seal 46 that have been placed across the opening 38 of the tank 40. In one embodiment, the opening of the tank 38 also includes a suitable fitting 48 for example a male or female npt adaptor to provide secure attachment of the connection assembly to the tank 40.

Figure 5:
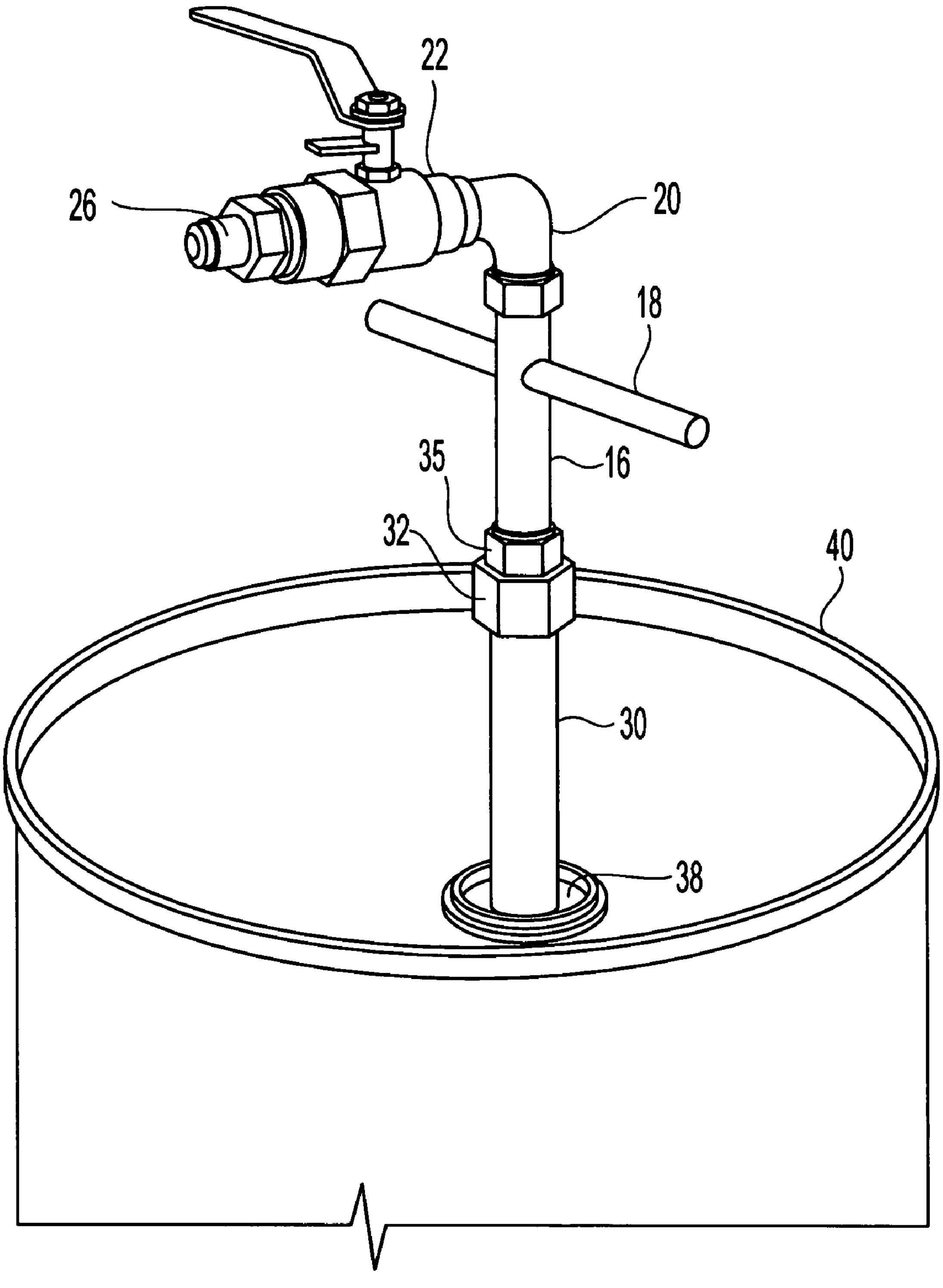
FIG. 5 is a top perspective view of the extraction tool inserted into a drum.

As illustrated in FIG. 5, once the extraction assembly has been inserted and sealed, the container or equipment to which the liquid is to be transferred are attached to the adaptor fitting and the valve is opened to permit the flow of liquid. The liquid can be caused to flow by using a pump to draw the liquid from the container 40, by pressurizing the container to force the liquid from the container and by creating a vacuum on the receiving equipment or container.

In one embodiment, the transfer tool 10 removes or transfers refrigerant from a steel storage drum to a centrifugal chiller. A refrigerant charging hose (not shown) is connected to the flare connection adaptor fitting 26 and to the charging port of the chiller. By opening the valve on the chiller and the transfer tool valve 22, the chiller, which is in vacuum, begins transferring refrigerant from the steel drum.

The transfer process is completed when the steel drum begins to collapse, indicating that all refrigerant has been evacuated and the drum pressure is in a vacuum. The chiller charging port and the valve 22 are closed and the disconnected from each other. The compression nut is loosened and the down tube is removed from the connection assembly. The connection assembly is then removed from the opening of the drum.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for extracting liquid from a container, the method comprising:

threading a central shaft of a connection assembly to threaded opening of the container the central shaft disposed outside the container;

passing a down tube comprising a piercing tip through the central shaft, piercing a seal covering the opening of the container using the piercing tip located adjacent an open end of the down tube;

using a handle attached to the down tube to drive the piercing tip through the seal; passing the down tube into the container until the open end of the down tube is disposed below a liquid level in the container;

tightening a compression fitting attached to the down tube around the central shaft to form an airtight seal between the down tube and the central shaft;

connecting a top end of the down tube opposite the open end to a destination for the liquid;

transferring the liquid form the container to the destination through the down tube using a source of vacuum at the destination to draw the liquid through the down tube;

controlling the flow of liquid through the down tube using a valve; and monitoring the flow of liquid through the down tube using a flow indicator;

wherein substantially all of the liquid is transferred from the container to the destination without tilting the container.

* * * * *